(12) United States Patent
Gomez et al.

(10) Patent No.: US 9,273,649 B2
(45) Date of Patent: Mar. 1, 2016

(54) SYSTEM AND METHOD FOR CONTROLLING AN ELECTRIC ASPIRATOR OF AN AIR INTAKE SYSTEM FOR A WORK VEHICLE

(71) Applicant: CNH Industrial America, LLC, New Holland, PA (US)

(72) Inventors: Lorenzo Gomez, Schiller Park, IL (US); William Schroeder, Downers Grove, IL (US); Thomas Chlystek, Darien, IL (US); Brian Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/291,978

(22) Filed: May 30, 2014

(65) Prior Publication Data
US 2015/0345439 A1  Dec. 3, 2015

(51) Int. Cl.
*B01D 46/00* (2006.01)
*F02M 35/08* (2006.01)
*F02M 35/09* (2006.01)
*F02M 35/104* (2006.01)

(52) U.S. Cl.
CPC ............. *F02M 35/086* (2013.01); *F02M 35/09* (2013.01); *F02M 35/104* (2013.01)

(58) Field of Classification Search
CPC ... F02M 35/08; F02M 35/086; F02M 35/024; F02M 35/09; F02M 35/104; B01D 45/12; B01D 46/0039; B01D 46/0023
USPC .................. 123/184.21, 198 E; 55/385.3, 482
See application file for complete search history.

(56) References Cited

U.S. PATENT DOCUMENTS

| | | | |
|---|---|---|---|
| 3,469,566 A | | 9/1969 | Wilkinson et al. |
| 3,656,303 A | | 4/1972 | La Force |
| 3,696,666 A | | 10/1972 | Johnson et al. |
| 4,135,897 A | | 1/1979 | Gondek |
| 4,204,848 A | * | 5/1980 | Schulmeister et al. ...... 55/315.2 |

(Continued)

FOREIGN PATENT DOCUMENTS

| | | |
|---|---|---|
| DE | 102008056938 | 2/2010 |
| FR | 2969931 | 7/2012 |
| WO | WO 8201325 | 4/1982 |

OTHER PUBLICATIONS

Related U.S. Patent Application bearing U.S. Appl. No. 61/726,229, filed Nov. 14, 2012.

(Continued)

*Primary Examiner* — Marguerite McMahon
(74) *Attorney, Agent, or Firm* — Sue C. Watson

(57) ABSTRACT

In one aspect, a system for controlling an air intake system for a work vehicle may generally include a filter assembly having a pre-cleaner configured to separate particulates from air received by the filter assembly. The pre-cleaner may define a pre-cleaner outlet. The system may also include an electric aspirator in fluid communication with the pre-cleaner outlet. The electric aspirator may include a motor configured to rotate a fan so as to create a vacuum for scavenging the particulates separated from the air within the pre-cleaner. In addition, the system may include a controller communicatively coupled to the electric aspirator. The controller may be configured to vary a rotational speed of the motor based on changes in a load-based parameter of the work vehicle.

17 Claims, 7 Drawing Sheets

(56) References Cited

U.S. PATENT DOCUMENTS

| | | | |
|---|---|---|---|
| 4,218,223 A * | 8/1980 | Lidstone et al. | 95/271 |
| 4,359,330 A | 11/1982 | Copley | |
| 4,514,193 A | 4/1985 | Booth | |
| 5,183,017 A | 2/1993 | Bopp | |
| 5,401,285 A * | 3/1995 | Gillingham et al. | 55/284 |
| 5,575,826 A | 11/1996 | Gillingham et al. | |
| 5,613,992 A | 3/1997 | Engel | |
| 6,390,081 B1 * | 5/2002 | Novak et al. | 123/676 |
| 6,588,524 B2 | 7/2003 | Keen et al. | |
| 6,780,215 B2 | 8/2004 | Keen et al. | |
| 6,800,117 B2 | 10/2004 | Barris et al. | |
| 6,878,189 B2 | 4/2005 | Moredock | |
| 7,160,355 B2 | 1/2007 | Steiner | |
| 7,832,371 B2 | 11/2010 | Fujita et al. | |
| 7,878,171 B2 | 2/2011 | Vandike et al. | |
| 8,007,565 B2 | 8/2011 | Moredock | |
| 8,048,391 B2 | 11/2011 | Molins | |
| 8,118,918 B2 | 2/2012 | Knox et al. | |
| 8,151,774 B2 | 4/2012 | McCauley et al. | |
| 8,262,762 B2 | 9/2012 | Olson et al. | |
| 8,641,792 B2 | 2/2014 | Vladaj et al. | |
| 8,657,928 B2 | 2/2014 | Moredock et al. | |
| 2005/0178111 A1 | 8/2005 | Kammel | |
| 2008/0178592 A1 * | 7/2008 | Bering | 60/605.1 |
| 2009/0308346 A1 * | 12/2009 | Vandike et al. | 123/198 E |
| 2010/0071978 A1 | 3/2010 | Kisse | |
| 2011/0011042 A1 | 1/2011 | Gillingham et al. | |
| 2011/0132311 A1 | 6/2011 | Pursifull et al. | |
| 2012/0272630 A1 | 11/2012 | James | |
| 2012/0311814 A1 | 12/2012 | Kah, Jr. | |
| 2013/0233287 A1 | 9/2013 | Leone | |
| 2013/0333665 A1 | 12/2013 | Pursifull | |
| 2014/0014080 A1 | 1/2014 | Beshay et al. | |

OTHER PUBLICATIONS

Related U.S. Patent Application bearing U.S. Appl. No. 13/951,854, filed Jul. 26, 2013.

* cited by examiner

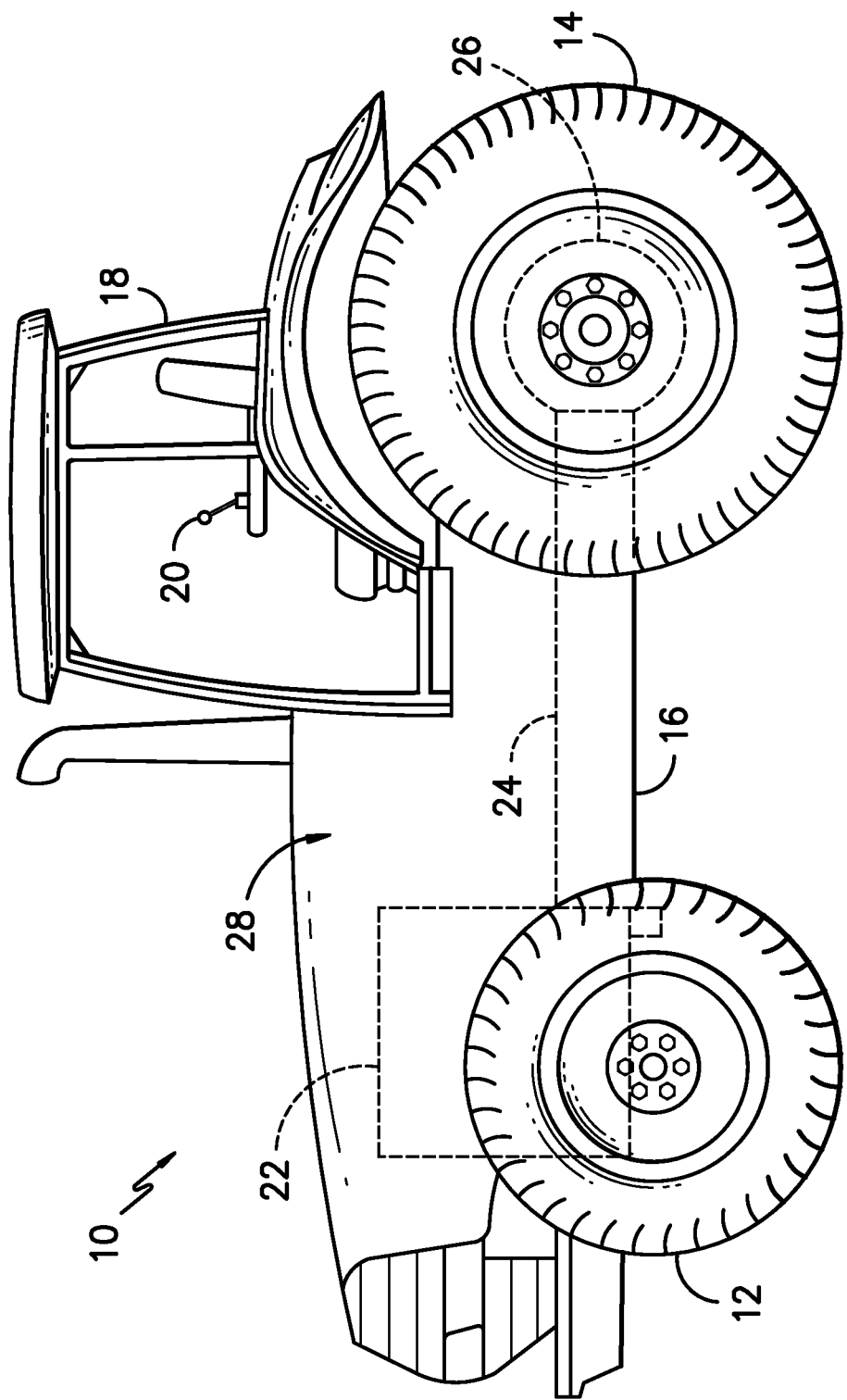
FIG. -1-

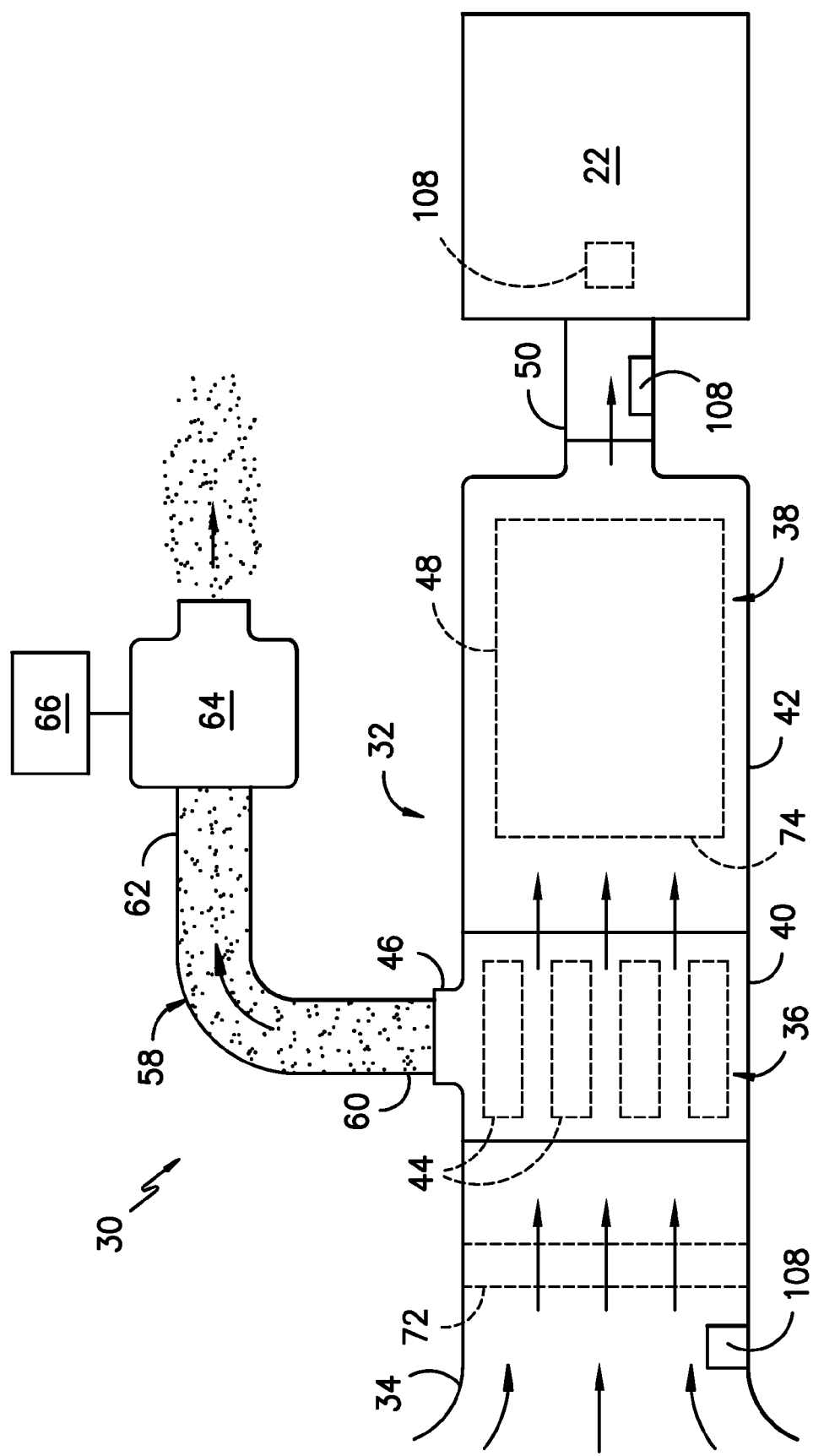
FIG. -2-

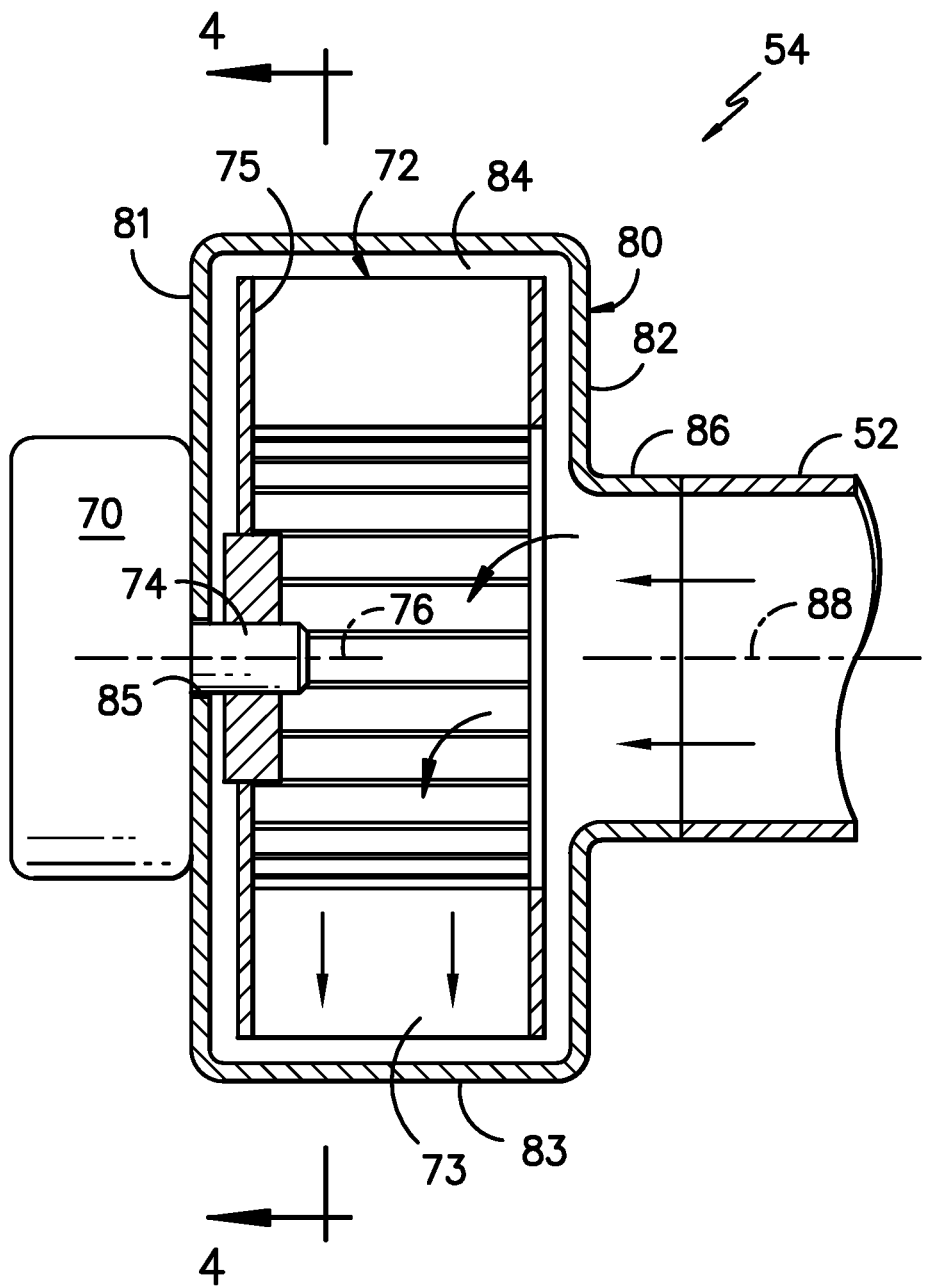
FIG. -3-

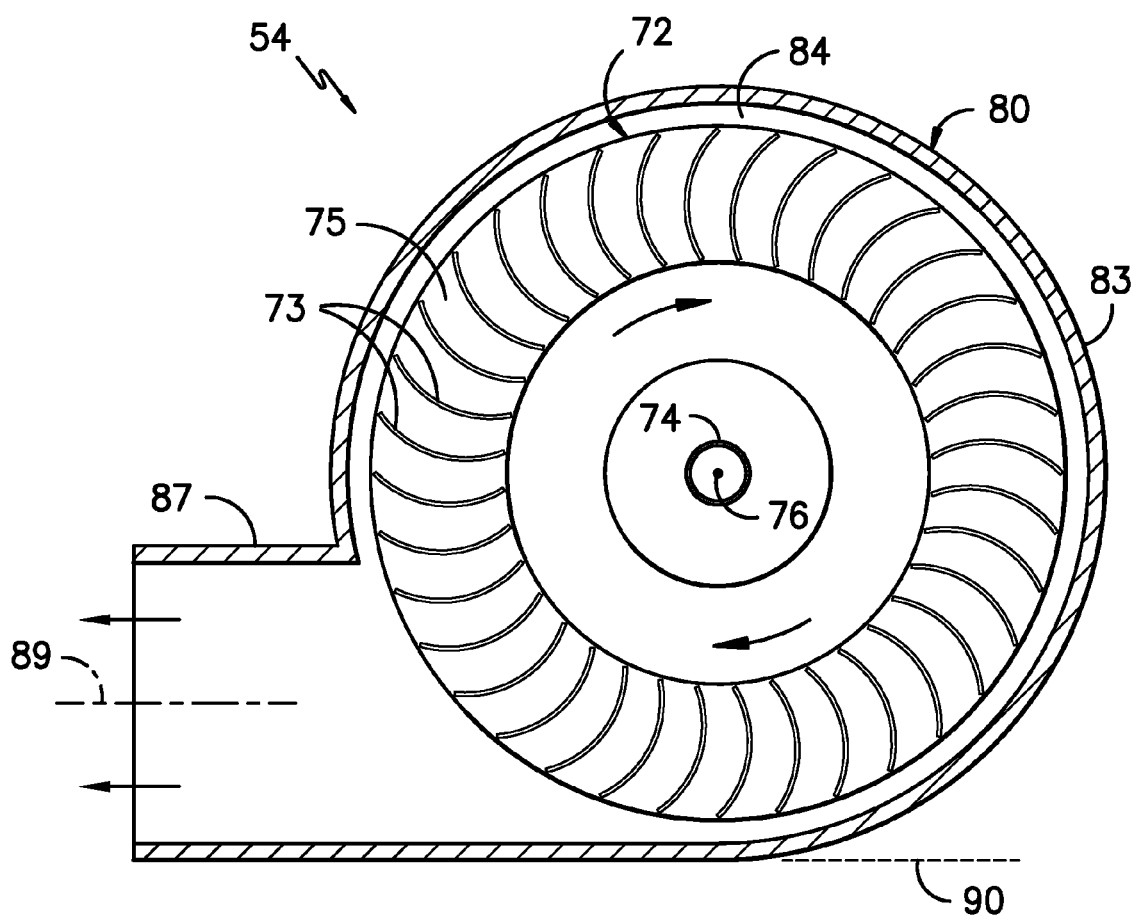
FIG. -4-

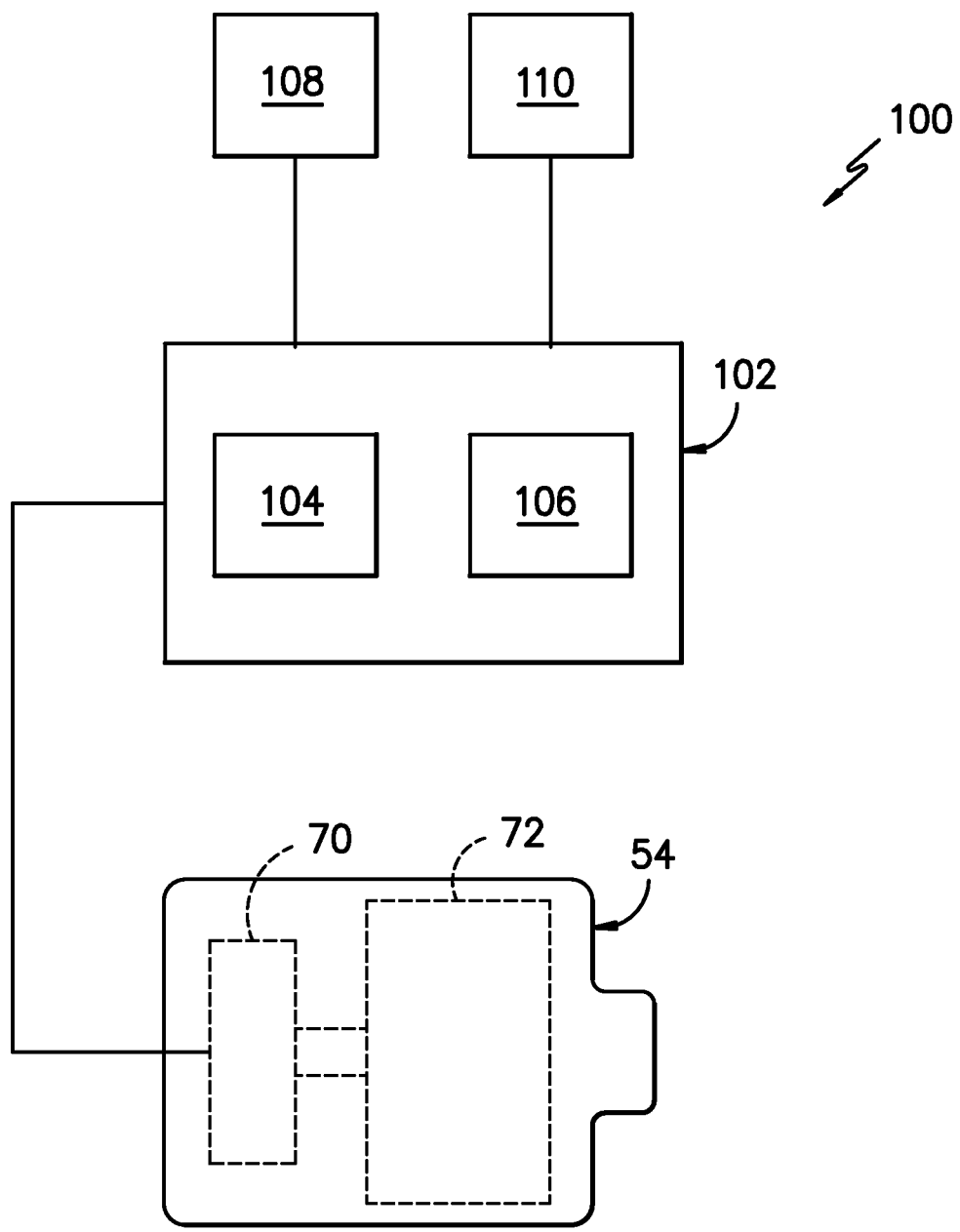
FIG. -5-

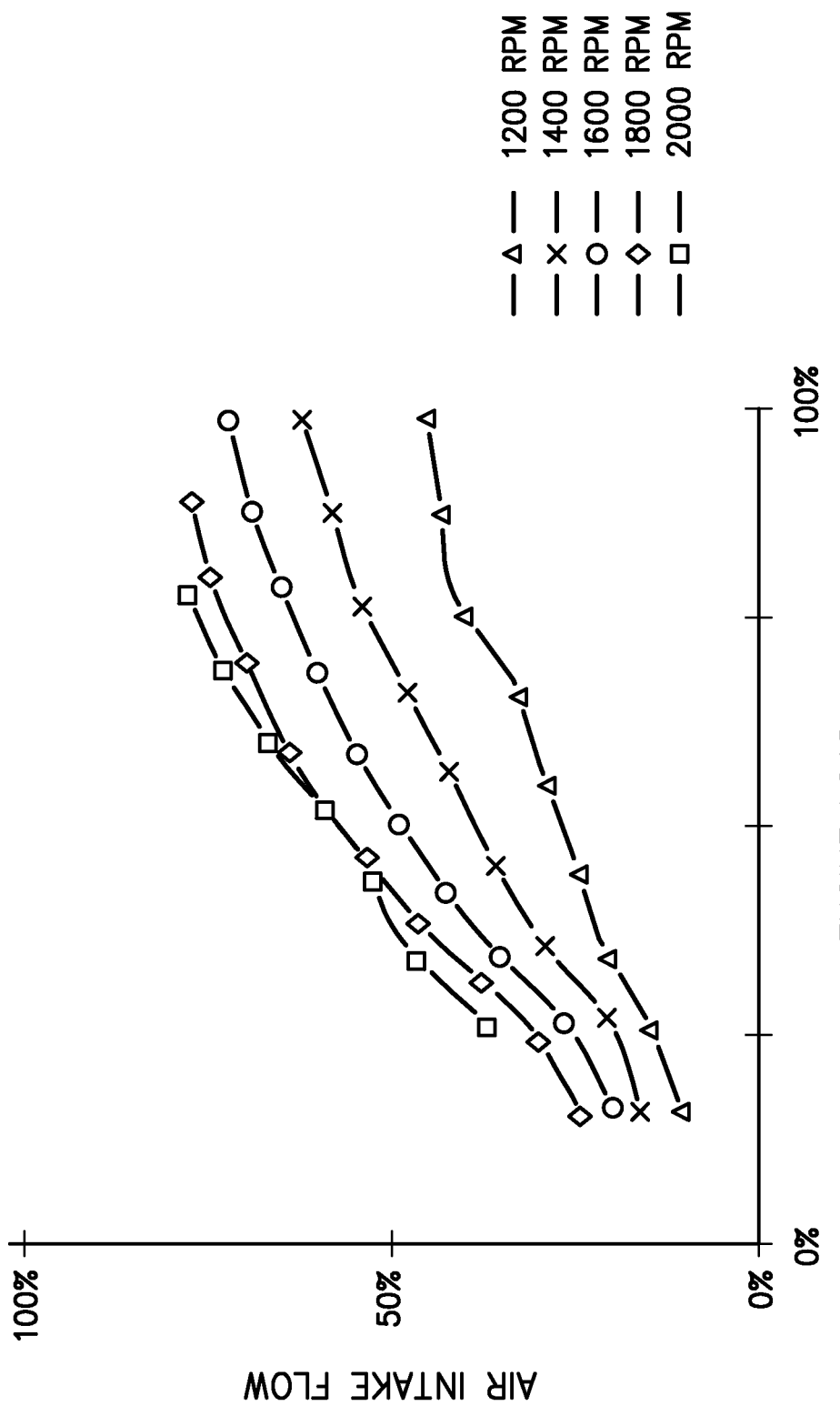
FIG. -6-

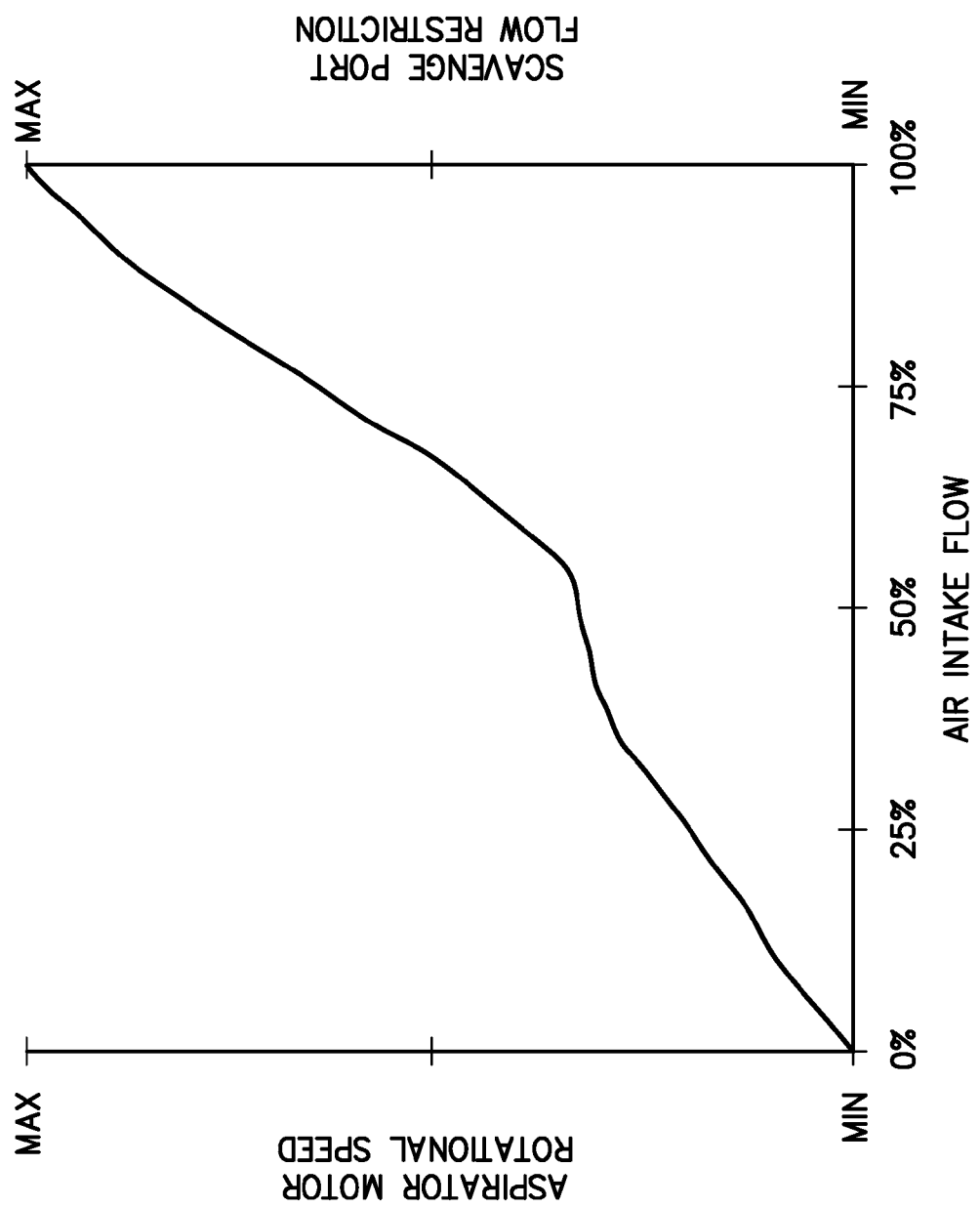
FIG. -7-

SYSTEM AND METHOD FOR CONTROLLING AN ELECTRIC ASPIRATOR OF AN AIR INTAKE SYSTEM FOR A WORK VEHICLE

FIELD OF THE INVENTION

The present subject matter relates generally to work vehicles and, more particularly, to a system and method for controlling an electric aspirator of an air intake system for a work vehicle.

BACKGROUND OF THE INVENTION

Work vehicles typically include internal combustion engines that require clean air for use within the combustion process. Since many work vehicles, such as tractors and other agricultural vehicles, operate in fields and other harvesting environments in which the ambient air contains large amounts of dust, plant material and other particulates, an air intake system having an effective filter assembly is required. For example, conventional filter assemblies for work vehicles typically include a vortex or cyclone pre-cleaner configured to separate large particulates from the intake air and a porous air filter downstream of the pre-cleaner to provide the final stage of filtering prior to delivering the air into the engine.

To prevent the air filter from clogging, the large particulates separated from the intake air by the pre-cleaner must be removed from the filter assembly. Typically, such particulates are removed from the filter assembly via an outlet duct using a vacuum generated by the exhaust flow from the engine. However, the vacuum generated by the exhaust flow is often insufficient to meet the performance requirements of the filter assembly, thereby causing the air filter to plug within a short period of time.

To address this issue, the use of an electric aspirator has been proposed as a means for generating a stronger vacuum to allow for effective removal of the particulates from the pre-cleaner. For example, international application number PCT/US13/58367 (Chlystek et al.), filed on Sep. 6, 2013 and entitled "Air Intake System for a Work Vehicle," discloses an electric blower for aspirating the pre-cleaner, the disclosure of which is hereby incorporated by reference herein in its entirety for all purposes. Specifically, the electric blower and related system of Chlystek et al. provides a means for effectively removing particulates from the pre-cleaner while also decreasing the risk of damage to the electric blower's motor.

However, while such a system certainly provides numerous advantages, a need continues to exist for refinements and improvements to electrically aspirated air intake systems. For instance, current control methodologies require that the motor associated with the electric aspirator run at a constant speed that is selected to accommodate the most extreme conditions. As a result, a significant amount of energy is wasted by forcing the alternator to continuously produce the power necessary to run the aspirator at the fixed speed. Moreover, by running the electric aspirator at the same speed for all operating conditions, the aspirator often provides more aspiration than is needed, which can lead to more flow restriction within the system and can cause the restriction sensor(s) within the system to be prematurely activated.

Accordingly, an improved system and method for controlling an electric aspirator used within an air intake system of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling an air intake system for a work vehicle. The system may generally include a filter assembly having a pre-cleaner configured to separate particulates from air received by the filter assembly. The pre-cleaner may define a pre-cleaner outlet. The system may also include an electric aspirator in fluid communication with the pre-cleaner outlet. The electric aspirator may include a motor configured to rotate a fan so as to create a vacuum for scavenging the particulates separated from the air within the pre-cleaner. In addition, the system may include a controller communicatively coupled to the electric aspirator. The controller may be configured to vary a rotational speed of the motor based on changes in a load-based parameter of the work vehicle.

In another aspect, the present subject matter is directed to a system for controlling an air intake system for a work vehicle. The system may generally include a filter assembly having a pre-cleaner configured to separate particulates from air received by the filter assembly. The pre-cleaner may define a pre-cleaner outlet. The system may also include an electric aspirator in fluid communication with the pre-cleaner outlet. The electric aspirator may include a motor configured to rotate a fan so as to create a vacuum for scavenging the particulates separated from the air within the pre-cleaner. In addition, the system may include a controller communicatively coupled to the electric aspirator. The controller may be configured to determine an air intake flow into an engine of the work vehicle and vary a rotational speed of the motor based on changes in the air intake flow. Specifically, the rotational speed of the motor may be varied such that a predetermined percentage of the air intake flow is scavenged from the pre-cleaner.

In a further aspect, the present subject matter is directed to a method for controlling an air intake system for a work vehicle. The method may generally include applying a vacuum via an electric aspirator to a pre-cleaner outlet of a pre-cleaner of the air intake system for scavenging particulates separated from air within the pre-cleaner, monitoring a load-based parameter of the work vehicle and varying a rotational speed of a motor of the electric aspirator based on changes in the load-based parameter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle;

FIG. 2 illustrates a simplified, schematic view of one embodiment of an air intake system suitable for use within the work vehicle shown in FIG. 1;

FIG. 3 illustrates a cross-sectional view of one embodiment of an electric aspirator suitable for use with the air intake system shown in FIG. 2;

FIG. 4 illustrates another cross-sectional view of the electric aspirator shown in FIG. 3 taken about line 4-4;

FIG. 5 illustrates a schematic diagram of one embodiment of a system for controlling an electric aspirator of an air intake system in accordance with aspects of the present subject matter;

FIG. 6 illustrates a graphical view of an example relationship between the engine load of a work vehicle (x-axis) and the air intake flow into an engine of the vehicle (y-axis) as a function of engine speed (in RPM); and FIG. 7 illustrates a graphical view of an example relationship between the air intake flow into an engine of a work vehicle (x-axis), the required rotational speed of a motor of an electric aspirator (y-axis on left side) and the flow restriction at an outlet port of a pre-cleaner of an associated air intake system (y-axis on right side).

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling an air intake system of a work vehicle. Specifically, in several embodiments, the air intake system may include a filter assembly having a pre-cleaner configured to separate particulates from the air flowing into the system and an air filter disposed downstream of the pre-cleaner. In addition, the air intake system may include an electric aspirator configured to aspirate the pre-cleaner by creating a vacuum that sucks the particulates out of the pre-cleaner. As will be described below, in several embodiments, the rotational speed at which a motor of the electric aspirator is rotated may be varied based on a load-based parameter of the work vehicle. For example, in one embodiment, the load-based parameter may correspond to an intake air flow of the engine of the work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices 20 (e.g., levers, pedals, control panels and/or the like) for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26. The engine 22, transmission 24, and differential 26 may collectively define a drive train 28 of the work vehicle 10.

Referring now to FIG. 2, a schematic view of one embodiment of an air intake system 30 suitable for use with the work vehicle 10 shown in FIG. 1 is illustrated in accordance with aspects of the present subject matter. As shown in FIG. 2, the air intake system 30 may generally include a filter assembly 32 configured to receive dirty air from an intake duct 34 and clean/filter such air for subsequent delivery to the engine 22. In general, the filter assembly 32 may include a pre-cleaner 36 and an air filter 38 disposed downstream of the pre-cleaner 36. In addition, the filter assembly 32 may include a pre-cleaner housing 40 configured to encase the pre-cleaner 36 and a filter housing 42 configured to encase the air filter 38. It should be appreciated that the pre-cleaner housing 40 and the filter housing may 42 be formed integrally with one another (e.g., by forming both housings 40, 42 as a single continuous housing) or the pre-cleaner housing 40 and the filter housing 42 may comprise separate components configured to be separately coupled to one another As is generally understood, the pre-cleaner 36 may be configured to remove portions of the dust, dirt, debris, plant matter and other particulates contained within the air flowing into the filter assembly 32 via the intake duct 34. Specifically, in several embodiments, the pre-cleaner 36 may include a plurality of tubes (e.g., turbo tubes), dirt separators, and/or any other suitable pre-cleaner elements 44 configured to separate particulates from the air via centripetal force. For example, the pre-cleaner elements 44 may be configured to impart a vortex or spinning motion to the flow of air entering the filter assembly 32. As a result, large particulates contained within the air may be forced radially outwardly along the inner wall of the pre-cleaner housing 40 by the centripetal force of the vortex/spinning motion. These large particulates may then be expelled from the filter assembly 32 via a scavenge or outlet port 46 defined in the pre-cleaner housing 40 (hereinafter referred to as the "pre-cleaner outlet 46").

Additionally, the air filter 38 may generally be configured to receive the cleaned air flowing from the pre-cleaner 36 and filter such air to provide a final stage of filtering prior to delivery of the air to the engine 22. Thus, as shown in FIG. 2, the air filter 38 may generally include one or more filter elements 48 configured to catch or trap the remaining particulates contained within the cleaned air. For instance, in several embodiments, the filter element(s) 48 may be made from a fibrous, porous or mesh material that allows air to pass therethrough while catching/trapping any particulates. The cleaned/filtered air may then be directed through a suitable conduit 50 to the engine 22, where the air may be mixed with fuel and combusted.

Referring still to FIG. 2, the disclosed air intake system 30 may also include a conduit 52 having an upstream end 53 in fluid communication with the pre-cleaner outlet 46 and a downstream end 55 in fluid communication with an electric aspirator 54 configured to aspirate the pre-cleaner 36. Specifically, as will be described in greater detail below, the aspirator 54 may be configured to generate a vacuum that sucks the particulates flowing along the inner wall of the pre-cleaner housing 40 out the pre-cleaner outlet 46 and through the conduit 52. The particulates may then be expelled from the aspirator 54 back into the environment.

It should be appreciated that the conduit 52 may generally be any suitable elongated member configured for the flow of air and/or fluid therethrough. For example, the conduit 52 may comprise a tube, hose, pipe, duct and/or any other conduit-like member defining a passageway for the flow of air/fluid.

Referring now to FIGS. 3 and 4, a specific embodiment of the electric aspirator described above is illustrated in accordance with aspects of the present subject matter. Specifically, FIG. 3 illustrates a cross-sectional view of the aspirator 54 shown in FIG. 2, particularly illustrating a cross-sectional view in a widthwise direction of the aspirator 54. Additionally, FIG. 4 illustrates another cross-sectional view of the aspirator 54 shown in FIG. 2, particularly illustrating a cross-sectional view taken about line 4-4 shown in FIG. 3.

As shown in FIGS. 3 and 4, the disclosed aspirator 54 may, in several embodiments, be configured as an electric blower and, thus, may generally include an electric motor 70 configured to rotationally drive a fan 72 such that a negative pressure or vacuum is generated within the aspirator 54 and the conduit 52 that is capable of aspirating the pre-cleaner 36. For example, as shown in FIG. 3, the fan 72 may be mounted to an output shaft 74 of the motor 70 such that rotation of the output shaft 74 rotationally drives the fan 72 about a rotational axis 76 of the motor 70. As will be described in greater detail below, it should be appreciated that the motor 70 may be configured to rotate the fan 72 at a variable speed, for example, depending on n load-based parameter of the work vehicle 10.

It should also be appreciated that the fan 72 may generally have any suitable configuration that permits it to function as described herein. For example, as shown in FIGS. 3 and 4, in one embodiment, the fan may be configured as a blower or centrifugal fan (also referred to as a squirrel cage fan) and may include a plurality of blades 73 (e.g., straight radial blades, forward-curved blades or backwards-curved blades) mounted to a suitable base or hub 75.

Additionally, the aspirator 54 may also include a housing 80 configured to encase and/or support the motor 70 and the fan 72. For example, as shown in the illustrated embodiment, the housing 80 may be generally cylindrically shaped and may include a first endwall 81, a second endwall 82 and a circumferential sidewall 83 extending between the first and second endwalls 81, 82. The endwalls 81, 82 and the sidewall 83 may generally define an enclosed, cylindrical volume 84 (hereinafter referred to as the "fan compartment 84") within which the fan 72 may be rotationally disposed. In such an embodiment, the motor 70 may be coupled to the housing 80 (e.g., using suitable mechanical fasteners, such as bolts, screws, brackets and/or the like) in a manner that permits the motor 70 to rotationally drive the fan 72 within the fan compartment 84. For instance as shown in FIG. 3, an opening 85 may be defined in the first endwall 81 such that, when the motor 70 is coupled to the housing 80, the output shaft 74 may extend through the opening 85 in order to rotationally drive the fan 72.

Moreover, the aspirator 54 may include an aspirator inlet 86 and an aspirator outlet 87 defined by the housing 80. In general, the aspirator inlet 86 may be configured to be in fluid communication with the conduit 52 such that particulates flowing through the conduit 52 may be directed into the fan compartment 84 via the aspirator inlet 86. For example, as shown in FIG. 3, the housing 80 may be configured such that the aspirator inlet 86 is defined by the second endwall 82 of the housing 80. In such an embodiment, aspirator inlet 86 may, for example, be positioned along the second endwall 82 such that an inlet centerline 88 of the aspirator inlet 86 is generally aligned with and/or extends parallel to the rotational axis 76 of the motor/fan 70, 72. As such, the flow of particulates through the aspirator inlet 86 and into the fan compartment 84 may be directed along a flow path that is generally parallel to the rotational axis 76. However, in other embodiments, the aspirator inlet 86 may be defined at any other suitable location on the housing 80 and the inlet centerline 88 may have any other suitable orientation relative to the rotational axis 76.

Similarly, the aspirator outlet 87 may generally correspond to an opening defined by the housing through which the particulates flowing into the fan compartment 84 are expelled from the aspirator 54. In several embodiments, the housing 80 may be configured such that the aspirator outlet 87 forms an outward extension of the cylindrical sidewall 83. For example, as shown in the illustrated embodiment, the aspirator outlet 87 may be configured to extend outwardly from the sidewall 83 such that an outlet centerline 89 of the aspirator outlet 87 extends generally perpendicular to the rotational axis 76 of the motor/fan 70,72 (and, optionally, the inlet centerline 88) and generally parallel to a tangent line 90 defined by the outer surface of the sidewall 83. Additionally, as shown in FIG. 4, the outlet centerline 89 may also be radially offset from the rotational axis 76 (and, optionally, the inlet centerline 86). As such, the flow of particulates entering the aspirator 54 along the inlet centerline 86 may be redirected within the fan compartment 84 prior to being expelled through the aspirator outlet 87. However, it should be appreciated that, in alternative embodiments, the aspirator outlet 87 may be defined so as to have any other suitable orientation that allows particulates to be expelled therefrom.

Additionally, in several embodiments, the aspirator outlet 87 may be configured to be positioned along a bottom portion of the housing 80. For example, as shown in FIG. 4, the aspirator outlet 87 may extend from a bottom half of the sidewall 83 (e.g. by extending parallel to the tangent line 90 defined at the very bottom of the housing 80). As such, in addition to the particulates being carried downward by the air flowing between the aspirator inlet 86 and the aspirator outlet 87, gravity may pull the particulates downward within the fan compartment 84, thereby assisting in directing the particulates towards the aspirator outlet 87.

It should be appreciated that, by mounting the motor 70 to the outside the housing 80 and by positioning the aspirator outlet 87 as described herein, the component life of the motor 70 may be enhanced significantly. Specifically, as shown in FIG. 3, the first endwall 81 of the housing 80 may generally serve to protect the motor from the particulates flowing into the fan compartment 84. Moreover, due to the relative positioning of the aspirator inlet 86 and outlet 88, the particulates entering the fan compartment 84 may be redirected away from the rotational axis 76 of the motor/fan 70, 72 towards the aspirator outlet 87. As such, any damage that may have otherwise occurred due to dirt, dust and/or other particulates flowing between the output shaft 74 and the first endwall 81 and into the motor 70 may be avoided.

Referring now to FIG. 5, one embodiment of a control system 100 for controlling an electric aspirator of an air intake system is illustrated in accordance with aspects of the present subject matter. In general, the control system 100 will be described herein with reference to the air intake system 30 and the electric aspirator 54 described above with reference to FIGS. 2-4. However, it should be appreciated that the disclosed control system 100 may generally be utilized with any other suitable air intake system and/or any other suitable electric aspirator.

As shown in FIG. 5, the control system 100 may generally include a controller 102 communicatively coupled to the electric aspirator 54 so as to allow the controller 102 to electronically control the operation of the aspirator 54. Specifically, in several embodiments, the controller 102 may be configured to control the rotational speed of the motor 70 based on one or more load-related parameters of the work vehicle 10. For instance, as will be described below, in one embodiment, the rotational speed of the motor 70 may be reduced at lower engine loads and increased at higher engine loads. As such, the electric aspirator 54 may require less energy to be operated at reduced loads, thereby saving on fuel efficiency. In addition, such reduced speeds may result in lower intake restriction within the system at the reduced engine loads.

In general, the controller 102 may comprise any suitable processor-based device known in the art, such as a computing device or any suitable combination of computing devices. Thus, in several embodiments, the controller 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 106 of the controller 102 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 106 may generally be configured to store suitable computer-readable instructions that, when implemented by the processor(s) 104, configure the controller 102 to perform various computer-implemented functions, such as the computer-implemented method(s) described herein. In addition, the controller 102 may also include various other suitable components, such as a communications circuit or module, one or more input/output channels, a data/control bus and/or the like.

In several embodiments, the load-based parameter used to vary the rotational speed of the aspirator motor 70 may correspond to an air intake flow into the engine 22. Specifically, as the engine load increases, the required air flow into the engine 22 must also be increased. For instance, FIG. 6 illustrates an example relationship between the engine load and the corresponding air intake flow as a function of engine speed (in RPM). As shown in FIG. 6, as the engine load increases between zero load and a full or 100% load at each engine speed, the air flow into the engine 22 must be correspondingly increased.

In one embodiment, to monitor the air flow into the engine 22, the controller 102 may be communicatively coupled to one or more flow sensor(s) 108 (e.g., one or more mass flow sensors). For instance, as shown in FIG. 2, a flow sensor(s) 108 may be mounted to and/or within the conduit 50 extending between the filter assembly 32 and the engine 22 so as to be in flow communication with the cleaned intake air flowing into the engine 22. Alternatively, the flow sensor(s) 108 may be positioned at any other suitable location and/or associated with any other suitable vehicle component that allows air intake flow to be monitored. For example, as shown in FIG. 2, a flow sensor(s) 108 (shown in dashed lines) may be positioned at a location within the engine 22 in order to monitor the air intake flow.

As an alternative to directly sensing the air intake flow, the controller 102 may be configured to utilize the air intake flow calculations associated with the engine control as the basis for estimating or determining the amount of air flowing into the engine 22. For instance, the controller 102 or a separate controller communicatively coupled to the controller 102 (e.g., an engine controller) may be configured to calculate the required intake flow for the engine 22 based on numerous factors, such as the commanded engine speed, the engine load, etc. In such an embodiment, the calculated intake flow may then be utilized by the controller 102 as the associated input for varying the operating speed of the aspirator motor 70. It should be appreciated that the mathematical relationship(s) for calculating the required intake flow for the engine 22 is well known in the art and, thus, will not be described in any detail herein.

By monitoring the air intake flow, the controller 102 may, in turn, be configured to vary the rotational speed of the aspirator motor 70 in a manner that provides for efficient and effective aspiration of the pre-cleaner 36 at all engine loads while allowing for reduced energy requirements at lower engine loads. Specifically, the inventors of the present subject matter have found that the most effective pre-cleaner aspiration typically occurs when a given percentage of the engine's intake flow is scavenged through the pre-cleaner port 46 via the aspirator 54. For example, according to several embodiments, effective pre-cleaner aspiration occurs when about 5% to about 15% of the air intake flow is scavenged through the outlet port 46, such as from about 7% to about 13% of the air intake flow or about 9% to about 11% of the air intake flow and/or any other subranges therebetween. Thus, by determining the motor speed required to scavenge such a percentage of the air intake flow for each potential intake flow for the engine 22, the controller 102 may be able to control the operation of the aspirator 54 so as to optimize the performance of the entire air intake system 30.

It should be appreciated that, by requiring that a certain percentage of the air intake flow be scavenged, the amount of air that must be sucked out of the pre-cleaner 36, as well as the amount of flow restriction at the pre-cleaner port 46, will generally increase as the air intake flow increases. As a result, with increased engine loads and, thus, increased air intake flows, the required rotational speed of the aspirator motor 70 will need to be correspondingly increased. For example, FIG. 7 illustrates an example graph charting the air intake flow (along the x-axis), the rotational speed of the aspirator motor 70 (along the left vertical axis) and the flow restriction at the pre-cleaner outlet port 46 (along the right vertical axis). As shown, as the air intake flow is increased with increasing engine loads, the flow restriction also increases. Accordingly, the rotational speed of the aspirator motor 70 must be correspondingly increased to ensure that the required percentage of air is scavenged from the pre-cleaner 36.

It should be appreciated that the correlation between the air intake flow and the required rotational speed of the aspirator motor 70 shown in FIG. 7 is only illustrated to provide one example of such a relationship. Those of ordinary skill in the art should readily understand that the specific correlation between such variables may generally vary depending on the specific configuration of the air intake system being used. It should also be appreciated that such correlation may generally be determined using any suitable analytical methodology known in the art. For instance, in one embodiment, the correlation may be determined experimentally, such as by monitoring the amount of air scavenged from the pre-cleaner 36 at differing motor speeds and at differing air flow rates through the specific air intake system being used. Alternatively, the correlation may be determined by modelling the air intake system using suitable modeling and/or analysis software.

Additionally, it should be appreciated that, once the correlation between the rotational speed of the aspirator motor 70 and the air intake flow is determined, such correlation may be stored or otherwise made accessible to the controller 102 in any suitable format and/or using any suitable means. For instance, in one embodiment, a data or look-up table may be stored within the controller's memory 106 that correlates the air intake flow to the motor speed. In such an embodiment, upon sensing and/or calculating the air intake flow, the controller 102 may refer to the stored table to determine the speed at which the aspirator motor must be rotated in order to scavenge the required air flow percentage.

Moreover, it should be appreciated that, in several embodiments, the capacity and/or specifications for the aspirator motor 70 may be selected so as to ensure that the aspirator 54 is capable of scavenging the required percentage of the air intake flow at the highest potential engine loads (and, thus, the highest potential air intake flows). For instance, the aspirator motor 70 may be selected such that, at its maximum rotational speed, the aspirator 54 is capable of scavenging at least the required air flow percentage when the air intake flow into the engine 22 is maximized.

In addition to the air intake flow, or as an alternative thereto, any other suitable load-related parameters may be used as a basis for adjusting the rotational speed of the aspirator motor 70. For instance, the rotational speed may be varied based on a pressure differential across the filter assembly 32. For instance, a suitable pressure sensor(s) (not shown) may be disposed upstream and downstream of the filter assembly 32 in order to monitor the pressure of the corresponding air intake flow. In such an embodiment, the controller 102 may be configured to receive the pressure measurements and, based upon the pressure differential across the filter assembly 32, vary the speed of the aspirator motor 70.

Moreover, in addition to the load-related parameter(s), or as alternative thereto, the operation of the aspirator 54 may be controlled as a function of any other suitable parameter or operating condition of the work vehicle 10. For instance, in several embodiments, the operation of the aspirator 54 may be controlled based on the amount of dust and/or other particulates contained within the air flowing into the air intake system 30. Specifically, in such embodiment, a suitable particulate sensor(s) 110 may be positioned upstream of the filter assembly 32 for monitoring the amount of particulates contained within the intake air flow. For instance, as shown in FIG. 2, a particulate sensor(s) 108 may be positioned at or adjacent to the inlet of the intake duct 34. In such an embodiment, the particulate sensor(s) 110 may be communicatively coupled to the controller 102 (e.g., as shown in FIG. 5). As such, the controller 102 may be configured to control the operation of the aspirator 54 based on the particulate concentration measurements provided by the particulate sensor(s) 110.

It should be appreciated that, in general, the controller 102 may be configured to control the operation of the aspirator 54 based on the amount of particulates contained within the intake air in accordance with any suitable control methodology. For instance, in several embodiments, the particulate-based measurements may be used in combination with the load-based variable speed control described above. Specifically, in such embodiments, the controller 102 may be configured to vary the rotational speed of the aspirator motor 70 as a function of the load-based parameter as long as the particulate sensor(s) 110 detects any amount of particulates within the incoming air. However, in the event that the particulate concentration measurements provided by the particulate sensor(s) 110 indicate that no particulates are contained within the incoming air, the controller 102 may be configured to turn off or shut down the aspirator 54 until particulates are once again detected by the particulate sensor(s) 110.

Alternatively, the controller 102 may be configured to control the operation of the aspirator 54 based solely on the amount of particulates contained within the intake air. For example, in a particular embodiment, the controller 102 may be configured to vary the rotational speed of the aspirator motor 70 as a function of the particulate concentration, such as by increasing the rotational speed with increases in the amount of particulates contained within the incoming air and/or by decreasing the rotational speed with decreases in the amount of particulates contained within the incoming air.

It should be appreciated that the particulate sensor(s) 110 may generally correspond to any suitable sensor(s) known in the art that allows for particulates to be detected within the air flowing into and/or through the air intake system 30. For instance, in one embodiment, the particulate sensor(s) 110 may correspond to one or more light sensors positioned within the intake duct 34, such as within a snorkel (not shown) of the intake duct 34. In such an embodiment, the particulate sensor(s) 110 may be configured to detect the presence of particulates within the air by detecting light reflected off of the particulates as such particulates flow into and/or through the intake duct 34.

It should also be appreciated that, as indicated above, the present subject matter is also directed to a method for controlling an electric aspirator of an air intake system. For instance, in several embodiments, the method may include applying a vacuum via the electric aspirator 54 to a pre-cleaner outlet 46 for scavenging particulates separated from the intake air within the pre-cleaner 36, monitoring a load-based parameter of the work vehicle 10 (e.g., the intake air flow) and varying a rotational speed of the aspirator motor 70 based on changes in the load-based parameter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling an air intake system for a work vehicle, the system comprising:
    a filter assembly including a pre-cleaner configured to separate particulates from air received by the filter assembly, the pre-cleaner defining a pre-cleaner outlet;
    an electric aspirator in fluid communication with the pre-cleaner outlet, the electric aspirator including a motor configured to rotate a fan so as to create a vacuum for scavenging the particulates separated from the air within the pre-cleaner;
    a controller communicatively coupled to the electric aspirator, the controller being configured to vary a rotational speed of the motor based on changes in a load-based parameter of the work vehicle; and
    a particulate sensor communicatively coupled to the controller, the particulate sensor being configured to detect the presence of particulates contained within the air received by the filter assembly.

2. The system of claim 1, wherein the load-based parameter comprises an air intake flow into an engine of the work vehicle.

3. The system of claim 2, further comprising a flow sensor communicatively coupled to the controller, the flow sensor being configured to monitor the air intake flow into the engine.

4. The system of claim 2, wherein the controller is configured to estimate the air intake flow into the engine.

5. The system of claim 2, wherein the controller is configured to vary the rotational speed of the motor based on changes in the air intake flow such that a predetermined percentage of the air intake flow is scavenged from the pre-cleaner.

6. The system of claim 5, wherein the predetermined percentage ranges from about 5% to about 15% of the air intake flow into the engine.

7. The system of claim 1, wherein the controller is configured to shut down the electric aspirator when the particulate sensor detects that no particulates are contained within the air received by the filter assembly.

8. A system for controlling an air intake system for a work vehicle, the system comprising:
  a filter assembly including a pre-cleaner configured to separate particulates from air received by the filter assembly, the pre-cleaner defining a pre-cleaner outlet;
  an electric aspirator in fluid communication with the pre-cleaner outlet, the electric aspirator including a motor configured to rotate a fan so as to create a vacuum for scavenging the particulates separated from the air within the pre-cleaner; and
  a controller communicatively coupled to the electric aspirator, the controller being configured to determine an air intake flow into an engine of the work vehicle, the controller being further configured to vary a rotational speed of the motor based on changes in the air intake flow,
  wherein the rotational speed of the motor is varied such that a predetermined percentage of the air intake flow is scavenged from the pre-cleaner, and
  wherein the predetermined percentage ranges from about 5% to about 15% of the air intake flow into the engine.

9. The system of claim 8, further comprising a flow sensor communicatively coupled to the controller, the flow sensor being configured to monitor the air intake flow into the engine.

10. The system of claim 8, wherein the controller is configured to estimate the air intake flow into the engine.

11. A system for controlling an air intake system for a work vehicle, the system comprising:
  a filter assembly including a pre-cleaner configured to separate particulates from air received by the filter assembly, the pre-cleaner defining a pre-cleaner outlet;
  an electric aspirator in fluid communication with the pre-cleaner outlet, the electric aspirator including a motor configured to rotate a fan so as to create a vacuum for scavenging the particulates separated from the air within the pre-cleaner;
  a controller communicatively coupled to the electric aspirator, the controller being configured to determine an air intake flow into an engine of the work vehicle, the controller being further configured to vary a rotational speed of the motor based on changes in the air intake flow; and
  a particulate sensor communicatively coupled to the controller, the particulate sensor being configured to detect the presence of particulates contained within the air received by the filter assembly,
wherein the rotational speed of the motor is varied such that a predetermined percentage of the air intake flow is scavenged from the pre-cleaner.

12. The system of claim 11, wherein the controller is configured to shut down the electric aspirator when the particulate sensor detects that no particulates are contained within the air received by the filter assembly.

13. A method for controlling an air intake system for a work vehicle, the air intake system including a filter assembly having a pre-cleaner and an electric aspirator in fluid communication with the pre-cleaner, the method comprising:
  applying a vacuum via the electric aspirator to a pre-cleaner outlet of the pre-cleaner for scavenging particulates separated from air within the pre-cleaner;
  monitoring a load-based parameter of the work vehicle;
  varying a rotational speed of a motor of the electric aspirator based on changes in the load-based parameter; and
  monitoring the presence of particulates contained within the air received by the filter assembly.

14. The method of claim 13, wherein monitoring a load-based parameter of the work vehicle comprises monitoring an air intake flow into an engine of the work vehicle.

15. The method of claim 14, wherein varying a rotational speed of a motor of the electric aspirator comprises varying the rotational speed of the motor based on changes in the air intake flow such that a predetermined percentage of the air intake flow is scavenged from the pre-cleaner.

16. The method of claim 15, wherein the predetermined percentage ranges from about 5% to about 15% of the air intake flow into the engine.

17. The method of claim 13, further comprising shutting the electric aspirator down if no particulates are contained with the air received by the filter assembly.

* * * * *